US012414886B1

(12) United States Patent
Seely

(10) Patent No.: US 12,414,886 B1
(45) Date of Patent: Sep. 16, 2025

(54) URINE BAG HOLDING BRACKET

(71) Applicant: Summers Dawn Seely, Grants Pass, OR (US)

(72) Inventor: Summers Dawn Seely, Grants Pass, OR (US)

( * ) Notice: Subject to any disclaimer, the term of this patent is extended or adjusted under 35 U.S.C. 154(b) by 700 days.

(21) Appl. No.: 17/866,523

(22) Filed: Jul. 17, 2022

Related U.S. Application Data

(60) Provisional application No. 63/323,206, filed on Mar. 24, 2022.

(51) Int. Cl.
*A61G 7/05* (2006.01)

(52) U.S. Cl.
CPC .................................. *A61G 7/0503* (2013.01)

(58) Field of Classification Search
CPC ... A61F 5/4404; A61B 2050/21; A61B 50/22; A61G 7/05; A61G 7/0503
USPC ................ 248/214, 215, 206.5, 95; 5/503.1; 604/322
See application file for complete search history.

(56) References Cited

U.S. PATENT DOCUMENTS 1,531,423 A * 3/1925 Simpson ................ H02G 3/125 220/3.9
3,345,023 A * 10/1967 Scott .................... A61G 7/0503 4/315
3,999,350 A * 12/1976 MacKenzie ........ A47B 96/1408 446/124
4,203,175 A * 5/1980 Heine .................... A47C 21/00 5/503.1
4,483,501 A * 11/1984 Eddy .................. F41C 33/0209 5/503.1
5,335,385 A * 8/1994 Brown ................... A47C 21/08 5/503.1
5,359,824 A * 11/1994 Koberstein ............. E04C 2/428 52/507
7,104,024 B1 * 9/2006 diGirolamo ............... E04B 2/96 403/231

(Continued)

FOREIGN PATENT DOCUMENTS

CN 209187302 U 8/2019
CN 210903601 U * 7/2020

(Continued)

*Primary Examiner* — Jonathan Liu
*Assistant Examiner* — Guang H Guan
(74) *Attorney, Agent, or Firm* — Jerry Haynes Law

(57) ABSTRACT

A portable urine collection bag holding bracket is an easy to use and manufacture, low cost and quickly detachable and fixable bracket that facilitates attachment of a urine collection bag or the like to a patient support system or other support at a desired adjustable position based on the user's requirement. The portable urine collection bag holding bracket comprises an L-shaped bracket, wherein the corner area of the L-shaped bracket comprises magnets that allow quick attachment and detachment of the L-shaped bracket to the bed, seat, wheelchair, stretcher, IV stand, or other patient support system or other support. Further, the L-shaped bracket is provided with a plurality of bracket holes to accommodate various configurations of hooks or hangers of the urine collection bag(s) and facilitate easy and quick attachment and detachment of the urine collection bag(s) with respect to the L-shaped bracket.

4 Claims, 2 Drawing Sheets

(56) References Cited

U.S. PATENT DOCUMENTS

| | | | | |
|---|---|---|---|---|
| 7,421,957 | B2 * | 9/2008 | Baez | E04H 6/42 211/113 |
| 7,814,590 | B2 * | 10/2010 | Powell | A47C 21/00 5/503.1 |
| 9,939,104 | B2 * | 4/2018 | Smith | F16M 13/022 |
| 10,907,341 | B2 * | 2/2021 | Edwards | F16B 7/185 |
| 2008/0283702 | A1 * | 11/2008 | Ikerd | E04B 1/2604 248/228.1 |
| 2024/0269025 | A1 * | 8/2024 | Williams | A61G 7/0503 |

FOREIGN PATENT DOCUMENTS

| | | | | | |
|---|---|---|---|---|---|
| CN | 213311725 | U | | 6/2021 | |
| CN | 214970875 | U | | 12/2021 | |
| CN | 215023324 | U | | 12/2021 | |
| CN | 215131300 | U | | 12/2021 | |
| DE | 7512491 | U | | 11/1975 | |
| DE | 8235580 | U1 | | 6/1983 | |
| DE | 94000135 | | | 3/1994 | |
| DE | 202009007761 | U1 | * | 10/2009 | A61G 7/0503 |
| GB | 8817131 | | | 8/1988 | |
| GB | 2430683 | A | * | 4/2007 | E04B 1/2612 |
| TW | M433852 | U | | 7/2012 | |

* cited by examiner

URINE BAG HOLDING BRACKET

CROSS-REFERENCE TO RELATED APPLICATIONS

This application claims the benefit of U.S. provisional application No. 63/323,206, filed Mar. 24, 2022, and entitled URINE BAG HOLDING BRACKET, which provisional application is incorporated by reference herein in its entirety.

FIELD OF THE INVENTION

The present invention relates generally to a bag holder. More so, the present invention relates to a portable urine bag holder.

BACKGROUND OF THE INVENTION

Generally, urine bags are used for patients in hospitals, nursing homes and other facilities when required such as, for example, after major surgical operations. After surgery, the surgical patient may be transferred from the operating room to an intensive care unit or general ward which is equipped with catheters and urine collection bags. A urine collection bag is typically connected to a catheter, which is inserted in the urethra of the patient. The urine collection bag may be supported by an infusion stand adjacent to the patient's bed or wheelchair, for example.

Numerous attempts have been made and several prior art devices are known for variety of holders. Even though these innovations may be suitable for the specific purposes to which they address, however, they would not be as suitable for the purposes of the present invention.

For example, patent number TWM433852U to Peng Qizong et al. discloses a urine bag holder which is a hanger configured to hang a urine bag on a support.

Patent number GB8817131D0 to Mcleod teaches a hanger for suspending an article such as a urine drainage bag which has spaced-apart holes to hang the bag.

Patent number DE9400135U1 to Dr Med discloses a complex support device for secretion bags. The support device has a hook-shaped upper part and a support plate connected thereto with a support for a secretion bag. The design is suitable for attachment to a patient support device but does not fit to any type of horizontal surface.

Patent number DE8235580U1 describes a secretion bag holder comprising a clamping plate with a hinge connected to a holding plate to hold a secretion bag.

Patent number CN215131300U to Cao Lei, et al. discloses a urine bag holding device comprising a waist belt for patient. A slidable locking mechanism on the belt can move along the belt while holding the urine bag.

Patent number CN215023324U to Yang et al. discloses a urine bag hang-ng fixture comprising an L-shaped mount that is provided with a measuring mechanism and holds the urine bag in position. However, the design is complex, expensive, and difficult to manufacture.

Patent number CN214970875U to Cai Xiaoli, et al. teaches an adjustable catheter fixing mechanism comprising a waist belt for a patient. One or more hangers is provided on the waist belt. A catheter holder on the waist belt is configured to adjustably hold a catheter and urine bag in place on the belt.

There are also other conventional ways to support a urine bag on a patient support system, such as by applying sticky tape, using cable ties, Velcro, rope, or the like to detachably hold the urine bag to the system. But all the above examples have some or the other demerits such as being expensive or difficult to manufacture, having a complex design or being bulky or inefficient. Thus, there is a need of the present invention to provide a portable urine bag holder that addresses and provides a straightforward design which is easy to use and manufacture, is low-cost and can conveniently hold a urine bag or the like at the desired position with provision to quickly change and fix the holder.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
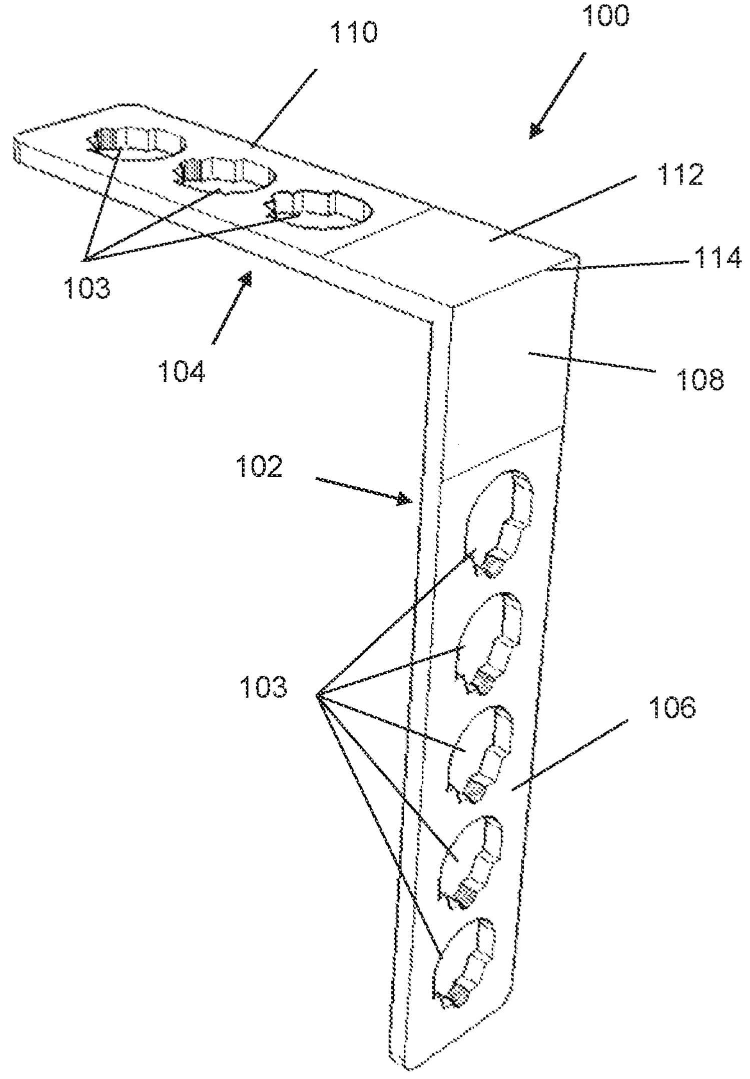
FIG. 1 illustrates a perspective view of an exemplary portable urine bag holding bracket, in accordance with an illustrative embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

In typical use of a urine collection bag attached to a catheter which is inserted in a patient's urethra, as soon as urine leaves the patient's bladder and enters the catheter, bacteria begin to accumulate in the catheter. If it is not properly drained from the bladder, the urine instantly reenters the patient's bladder. This places the patient at risk for a Urinary Tract Infection (UTI) which can spread upward into the kidneys and cause serious complications to the patient, including kidney damage or sepsis. Currently, the catheter and the urine collection bag may be placed on the floor or suspended from any nearby object which may be so high that proper drainage of urine into the urine collection bag is restricted. If the patient is subsequently transferred, the urine collection bag may be tossed onto the patient and then suspended on a stationary component of the bed that does not facilitate proper drainage of the urine from the patient. This may be a significant problem at nursing facilities or home or during travel. The portable urine bag holding bracket 100 of the present invention, when used in conjunction with evidence-based practice, can assist in preventing the above situations and facilitate ease in drainage of urine from the patient.

According to some embodiments of the present invention, a portable urine bag holding bracket, hereinafter bracket 100, as shown in FIGS. 1-4 is an easy-to-use and manufacture, low-cost and quickly detachable and fixed bracket that allows a urine collection bag or the like to be supported at a desired adjustable position based on the user's requirements. The bracket 100 may include a L-shaped bracket. The corner area of the L-shaped bracket 100 may be magnetized to facilitate quick attachment and detachment of the bracket 100 to a bed, seat, or wheelchair, stretcher, IV stand, or similar patient support system. Further, as will be hereinafter described, the bracket 100 may be provided with a plurality of bracket holes 103 to accommodate hooks or hangers for the urine collection bag or bags in various numbers and configurations or orientations.

According to one aspect of the present invention as shown in FIG. 1, a portable urine collection bag holding bracket 100 may include a first bracket portion 102. The first bracket portion 102 may include a first proximal segment 106 and a first distal segment 108. The first proximal segment 106 may be elongated. The first distal segment 108 of the first bracket portion 102 may be magnetized. The first proximal segment 106 may include a plurality of bracket holes 103.

The urine bag holding bracket 100 may further include a second bracket portion 104. The second bracket portion 104 may include a second proximal segment 110 and a second distal segment 112. The second proximal segment 110 may be elongated. The second distal segment 112 of the second bracket portion 104 may be magnetized. The second proximal segment 110 may include a plurality of bracket holes 103. Further, the first distal segment 108 of the first bracket portion 102 and the second distal segment 112 of the second bracket portion 104 may meet orthogonally to form the bracket 100.

According to another aspect of the present invention, the bracket 100 may be "L-shaped".

According to another aspect of the present invention, the first bracket portion 102 of the bracket 100 may be 8-16 inch long.

According to another aspect of the present invention, the second bracket portion 104 of the bracket 100 may be 6-10 inch long.

According to another aspect of the present invention, the first bracket portion 102 and the second bracket portion 104 of the bracket 100 may be 1-2 inch wide and 1-5 mm thick.

According to another aspect of the present invention, the first bracket portion 102 may comprise 4-7 bracket holes 103.

According to another aspect of the present invention, the first bracket portion 102 may comprise 3-5 bracket holes 103.

According to another aspect of the present invention, the bracket holes 103 may be disposed in aligned and spaced-apart relationship to each other along the longitudinal axis of the corresponding first proximal segment 106 of the first bracket portion 102 and second proximal segment 110 of the second bracket portion 104.

According to another aspect of the present invention, each of the bracket holes 103 may resemble a human head configuration to allow quick and adjustable attachment and detachment of hooks or hangers for the urine collection bag or bags in various numbers and configurations.

According to another aspect of the present invention, each bracket hole 103 may have a multi-faceted shape with a curved or concave first edge 120; a pair of straight, parallel, spaced-apart side edges 121 extending from the first edge 120; a pair of straight outer stepped edges 122 extending inwardly from the respective side edges 121; a pair of straight sloped edges 123 angling inwardly from the respective outer stepped edges 122; a pair of straight inner lower stepped edges 124 extending inwardly from the respective sloped edges 123; and a curved or concave second edge 125 extending between the inner stepped edges 124.

One objective of the present invention is to provide a portable urine collection bag holding bracket 100 that is easy to use, manufacture and transport.

Another objective of the present invention is to provide a portable urine collection bag holding bracket 100 that is provided with a possible magnetized portion, thereby allowing quick attachment and detachment of the urine collection bag or bags to the bracket 100.

Yet another objective of the present invention is to provide a portable urine collection bag holding bracket 100 that is provided with multiple bracket holes 103 at predetermined distances and spacings along the first proximal segment 106 of the first bracket portion 102 and along the second proximal segment 110 of the second bracket portion 104, thereby allowing adjustable attachment of the urine collection bags to the bracket 100 at desired positions or heights as per the requirement.

Another objective of the present invention is to provide a portable urine collection bag holding bracket 100 that is that is provided with multiple bracket holes 103, wherein each of the bracket holes 103 may resemble a human head configuration to allow quick and adjustable attachment and detachment of hooks or hangers for the urine collection bags in various numbers and configurations.

According to an illustrative embodiment of the present invention, FIG. 1 illustrates a perspective view of the exemplary portable urine bag holding bracket 100, wherein the bracket comprises a first bracket portion 102 and a second bracket portion 104. The first bracket portion 102 of the bracket 100 may be 8-16 inch long, preferably 10 inch long. The second bracket portion 104 of the bracket 100 may be 6-10 inch long, preferably 7 inch long. The first bracket portion 102 and the second bracket portion 104 of the bracket 100 may be approximately 2 inch wide and 1-5 mm thick. Further, the first bracket portion 102 may include 4-7 bracket holes 103, and preferably, 5 bracket holes 103. However, the second bracket portion 104 of the bracket 100 may include 3-5 bracket holes 103, and preferably, 3 bracket holes 103. The bracket holes 103 may be disposed in aligned and spaced-apart relationship to each other along the longitudinal axis of the corresponding first proximal segment 106 of the first bracket portion 102 and second proximal segment 110 of the second bracket portion 104.

Figure 4:
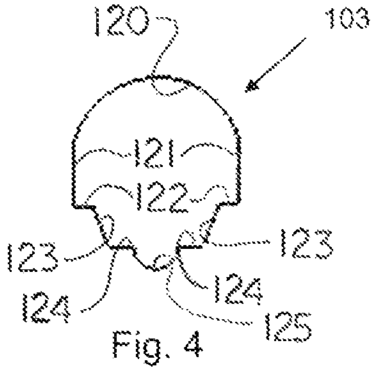
FIG. 4 illustrates a front view of a slot of the illustrative portable urine bag holding bracket.

Each of the bracket holes 103 may resemble a human head configuration, as shown in FIG. 4. Accordingly, each bracket hole 103 may have a multi-faceted shape with a curved or concave first edge 120; a pair of straight, parallel, spaced-apart side edges 121 extending from the first edge 120; a pair of straight outer stepped edges 122 extending inwardly from the respective side edges 121; a pair of straight sloped edges 123 angling inwardly from the respective outer stepped edges 122; a pair of straight inner lower stepped edges 124 extending inwardly from the respective sloped edges 123; and a curved or concave second edge 125 extending between the inner stepped edges 124.

The first bracket portion 102 and the second bracket portion 104 may meet orthogonally to form the bracket 100 that is "L-shaped". Further, the first distal segment 108 of the first bracket portion 102 and the second distal segment 112 of the second bracket portion 104 may be magnetized to facilitate quick attachment and detachment of the bracket 100 to the bed, seat, wheelchair, stretcher, IV stand, or other patient support system (not illustrated). The L-shaped bracket 100 may be configured to strongly attach to the edge of the patient support system such that the first bracket portion 102 or the second bracket portion 104 interchangeably hangs downwardly from the patient support system to hold the urine collection bag at the desired position.

Figure 2:
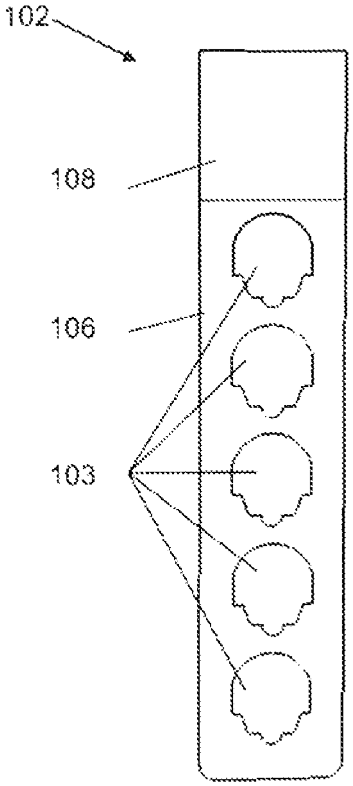
FIG. 2 illustrates a top view of the illustrative portable urine bag holding bracket.
Figure 3:
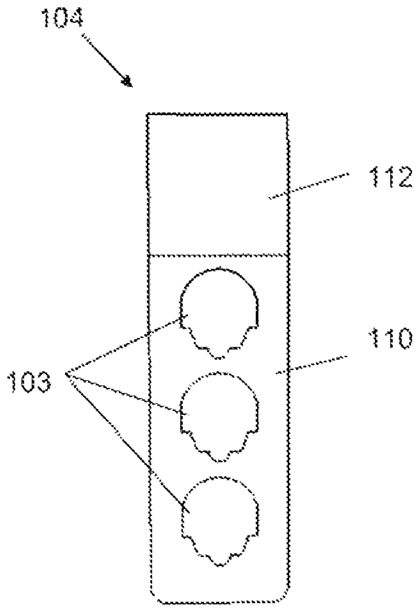
FIG. 3 illustrates a front view of the illustrative portable urine bag holding bracket.

FIG. 2 illustrates a top view of the exemplary portable urine bag holding bracket 100, in accordance with an illustrative embodiment of the present invention. FIG. 3 illustrates a front view of the exemplary portable urine bag holding bracket 100, in accordance with an illustrative embodiment of the present invention, and illustrates the respective first and second distal segments 108, 112 that may be magnetized and the respective first and second proximal segments 106, 110 that are non-magnetized portions of the respective first bracket portion 102 or the second bracket portion 104 of the bracket 100. The multiple bracket holes 103, provided at different heights, may facilitate adjustment in the hanging positions of the urine collection bag as per the need of the patient. The straightforward design of the bracket 100 allows easy alignment of the catheter with respect to the urine collection bag while facilitating ease in visualization of the urine output and drainage into the urine collection bag without any blockage, stagnant or reverse flow of urine towards the patient.

The bracket 100 of the present invention can be used for any other applications without limiting from the scope and spirit of the present invention.

According to another exemplary embodiment of the present invention, the bracket 100 can be manufactured using any material including metal or non-metal, wherein the first and second distal segments 108, 112 of the respective first bracket portion 102 and second bracket portion 104 may be embedded or glued with magnets or magnetized via other technology known in the art for a desired length of 1-2 inch. These first and second distal segments 108, 112 of the respective first bracket portion 102 or the second bracket portion 104 of the bracket 100 may meet along an orthogonal meeting line 114 to form the L-shaped bracket 100.

In typical application, the bracket 100 may support a urine collection bag (not illustrated) on a bed, seat, wheelchair, stretcher, IV stand, or other suitable patient support system or other support (not illustrated) in a position which is optimal to facilitate efficient drainage of urine from the patient through a catheter attached to the urine support bag. Accordingly, the typically magnetic first distal segment 108 of the first bracket portion 102 and/or second distal segment 112 of the second bracket portion 104 may be magnetically attached to a magnetic element on the patient support system or other support. A hook or hanger (not illustrated) on the urine collection bag may be placed into engagement with one of the vertically spaced bracket holes 103 in the first proximal segment 106 of the first bracket portion 102 or with one of the horizontally spaced bracket holes 103 in the second proximal segment 110 of the second bracket portion 104. The choice of which set of the bracket holes 103 is used for the purpose may depend on such factors as the type of patient support system or other support which is used to support the urine collection bag, as well as the vertical and/or horizontal position of the urine support bag with respect to the patient. The unique shape and configuration of each bracket hole 103 may be particularly well-suited to the particular type of hook or hanger which is commonly used to attach the urine support bag to the bracket 100.

Subsequent removal of the full urine collection bag may be accomplished by disengagement of the hook or hanger from the bracket hole 103. A replacement urine collection bag may be attached to the same or a different bracket hole 103, as needed. The bracket 100 may be removed from the patient support system or other support by detaching the first distal segment 108 of the first bracket portion 102 and/or the second distal segment 112 of second bracket portion 104 from the magnetic element on the system or other support.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A portable urine collection bag holding bracket, wherein the bracket comprises:

a first bracket portion, wherein the first bracket portion comprises an elongated first proximal segment and a first distal segment extending from the first proximal segment, and the first proximal segment comprises a first plurality of aligned, spaced-apart, multi-faceted bracket holes;

a second bracket portion, wherein the second bracket portion comprises an elongated second proximal segment and a second distal segment, wherein the second distal segment is magnetized, and the second proximal segment comprises a second plurality of aligned, spaced-apart, multi-faceted bracket holes, further the first distal segment of the first bracket portion and the second distal segment of the second bracket portion meet orthogonally at an orthogonal meeting line to form the bracket; and wherein each of the first plurality of aligned, spaced-apart, multi-faceted bracket holes comprises:

a curved or concave first edge;

a pair of straight, parallel, spaced-apart side edges extending from the first edge;

a pair of straight outer stepped edges extending inwardly from the side edges, respectively;

a pair of straight sloped edges angling inwardly from the outer stepped edges, respectively;

a pair of straight inner lower stepped edges extending inwardly from the sloped edges, respectively; and a curved or concave second edge extending between the inner lower stepped edges.

2. The bracket of claim 1, wherein the bracket is "L"-shaped.

3. The bracket of claim 1, wherein the first distal segment is magnetized.

4. The bracket of claim 1, wherein the second bracket portion is 6-10 inch long.

* * * * *